(12) United States Patent
Mugiraneza et al.

(10) Patent No.: US 10,747,352 B2
(45) Date of Patent: Aug. 18, 2020

(54) DISPLAY INCLUDING TOUCH PANEL (71) Applicant: Sharp Kabushiki Kaisha, Sakai, Osaka (JP)

(72) Inventors: Jean Mugiraneza, Sakai (JP); Yasuhiro Sugita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/339,413

(22) PCT Filed: Nov. 17, 2017

(86) PCT No.: PCT/JP2017/041567
§ 371 (c)(1),
(2) Date: Apr. 4, 2019

(87) PCT Pub. No.: WO2018/097070
PCT Pub. Date: May 31, 2018

(65) Prior Publication Data
US 2019/0227660 A1    Jul. 25, 2019

(30) Foreign Application Priority Data

Nov. 24, 2016  (JP) .................................. 2016-228223

(51) Int. Cl.
*G06F 3/041* (2006.01)
*G06F 3/044* (2006.01)
*G02F 1/1362* (2006.01)
*G02F 1/1333* (2006.01)
*G06F 3/047* (2006.01)
*G09F 9/00* (2006.01)
*G02F 1/1368* (2006.01)
*G09F 9/30* (2006.01)

(52) U.S. Cl.
CPC .......... *G06F 3/0412* (2013.01); *G02F 1/1368* (2013.01); *G02F 1/13338* (2013.01); *G02F 1/136286* (2013.01); *G06F 3/041* (2013.01); *G06F 3/044* (2013.01); *G06F 3/047* (2013.01); *G06F 3/0416* (2013.01); *G09F 9/00* (2013.01); *G09F 9/30* (2013.01)

(58) Field of Classification Search
CPC .......... G02F 1/13338; G02F 1/136286; G02F 1/1368; G06F 3/041; G06F 3/0412; G06F 3/0416; G06F 3/04164; G06F 3/044; G06F 3/047; G06F 3/0418; G09F 9/00; G09F 9/30

See application file for complete search history.

(56) References Cited

U.S. PATENT DOCUMENTS

2014/0132559 A1    5/2014  Kim
2015/0091849 A1*   4/2015  Ludden .................. G06F 3/044
                                                              345/174

(Continued)

*Primary Examiner* — Richard J Hong
(74) *Attorney, Agent, or Firm* — Keating & Bennett, LLP (57) ABSTRACT

The present invention reduces the width of a frame region. A touchscreen (5) includes: M sense lines 6; pad electrodes (7) that are arranged in N rows×M columns; (N×M) switching elements 8; N multiplexers (9); N sets of M drive lines (10), each of the M drive lines (10) connecting between a multiplexer (9) and one of M pad electrodes (7) in a row that corresponds to the multiplexer (9); and a driving circuit (11) that is connected to the N multiplexers (9).

6 Claims, 11 Drawing Sheets (56) References Cited

U.S. PATENT DOCUMENTS

| | | | |
|---|---|---|---|
| 2015/0123933 A1* | 5/2015 | Jang | G06F 3/044 |
| | | | 345/174 |
| 2016/0170531 A1* | 6/2016 | Lee | G06F 3/0416 |
| | | | 345/174 |
| 2017/0003792 A1* | 1/2017 | Berget | G06F 3/0412 |
| 2017/0017325 A1* | 1/2017 | Tsai | G06F 3/0412 |
| 2017/0052614 A1* | 2/2017 | Hsiao | G06F 3/0416 |
| 2017/0090630 A1* | 3/2017 | Kim | G06F 3/0416 |
| 2017/0090644 A1* | 3/2017 | Yao | G06F 3/0416 |
| 2017/0185194 A1* | 6/2017 | Kim | G06F 3/0412 |
| 2017/0205913 A1* | 7/2017 | Kimura | G06F 3/0416 |
| 2017/0228084 A1* | 8/2017 | Kim | G06F 3/0412 |
| 2017/0277346 A1* | 9/2017 | Jeong | G06F 3/044 |
| 2018/0074613 A1* | 3/2018 | Lee | G06F 3/0418 |

* cited by examiner

PIXEL CONFIGURATION IN BEZEL REGION

DISPLAY INCLUDING TOUCH PANEL

TECHNICAL FIELD

The present invention relates to a touchscreen-containing display which is a display that contains a capacitive touchscreen.

BACKGROUND ART

There has been known a touchscreen-containing display which is a display that contains a capacitive touchscreen (Patent Literature 1). In the touchscreen-containing display disclosed in Patent Literature 1, a plurality of pixels are formed at the intersections of a plurality of data lines and a plurality of gate lines. The capacitive touchscreen contained in the touchscreen-containing display is a self-capacitive touchscreen. This self-capacitive touchscreen includes a plurality of touch electrodes and a plurality of touch electrode lines connected to the respective plurality of touch electrodes.

The self-capacitive touchscreen is provided with a touch sensing unit. The touch sensing unit includes: a touch electrode driving circuit that drives the plurality of touch electrodes by supplying electric current during a touch sensing period in one frame period; and a touch determining circuit that holds touch voltages of the respective touch electrodes when the average voltage of the touch electrodes reaches a predetermined reference voltage and compares each of the touch voltages with a slope voltage to determine whether or not each of the touch electrodes is touched while the touch voltages are being held.

The touchscreen-containing display includes a driver that outputs image signals to the data lines, that outputs a scan signal to the gate lines, and that outputs a common voltage to the touch electrodes.

CITATION LIST

Patent Literature

[Patent Literature 1]
United States Patent Application Publication, No. 2014/0132559 (Publication Date: May 15, 2014)

SUMMARY OF INVENTION

Technical Problem

However, according to the conventional technique like that described above, the touch sensing unit, which includes the touch electrode driving circuit that drives the touch electrodes and the touch determining circuit that determines whether or not each touch electrode has been touched, is disposed in a frame region of the touchscreen-containing display on one side where one end of each data line is located. Therefore, the above technique has an issue in that the frame region on one side where one end of each data line is located is occupied by the touch sensing unit and that the frame region is large in width.

An object of one aspect of the present invention is to provide a touchscreen-containing display in which the frame region can be reduced in width.

Solution to Problem

In order to attain the above object, a touchscreen-containing display in accordance with one aspect of the present invention includes: a circuit board that includes display pixels at intersections of data lines and gate lines; a counter substrate that is disposed so as to face the circuit board; a display layer that lies between the circuit board and the counter substrate; and a touchscreen that is configured to detect a touch to the counter substrate, the touchscreen including M (M is a number of two or more) sense lines each of which extends parallel to the data lines, pad electrodes that are arranged in N (N is a number or two or more) rows×M columns so as to correspond to the M sense lines, (N×M) switching elements each of which is provided between a corresponding one of the M sense lines and a corresponding one of the pad electrodes, N multiplexers that are arranged so as to correspond to respective first to N-th rows of the pad electrodes, N sets of M drive lines, each of the M drive lines connecting between one of the N multiplexers and one of M pad electrodes in a row that corresponds to the one of the N multiplexers, and a driving circuit that is connected to the N multiplexers.

Advantageous Effects of Invention

According to one aspect of the present invention, it is possible to provide a touchscreen-containing display in which a frame region can be reduced in width.

BRIEF DESCRIPTION OF DRAWINGS

(a) of FIG. 2 illustrates how a self-capacitive pad electrode included in the touchscreen-containing display operates, and (b) of FIG. 2 illustrates how mutual-capacitive pad electrodes operate.

DESCRIPTION OF EMBODIMENTS

The following description will discuss embodiments of the present invention in detail.

Embodiment 1

(Configuration of Touchscreen-Containing Display 1)

Figure 1:
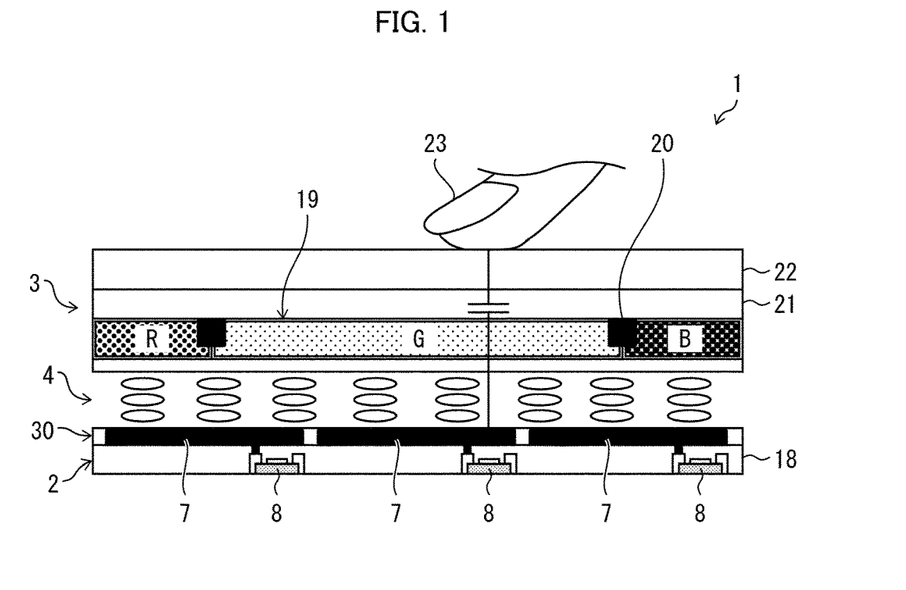
FIG. 1 is a cross-sectional view schematically illustrating a configuration of a touchscreen-containing display in accordance with Embodiment 1.
Figure 2:
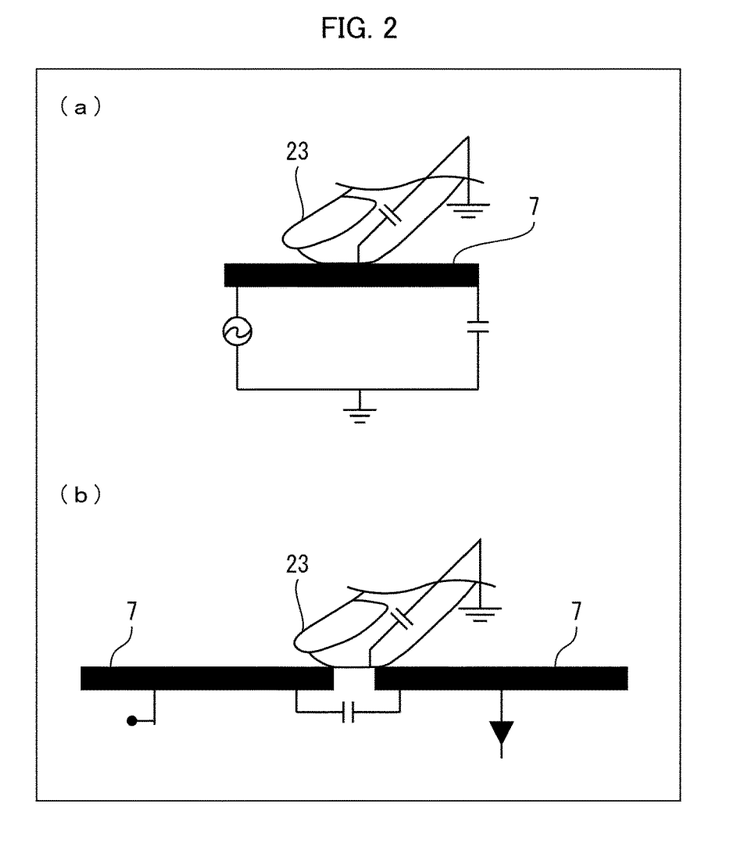
Figure 3:
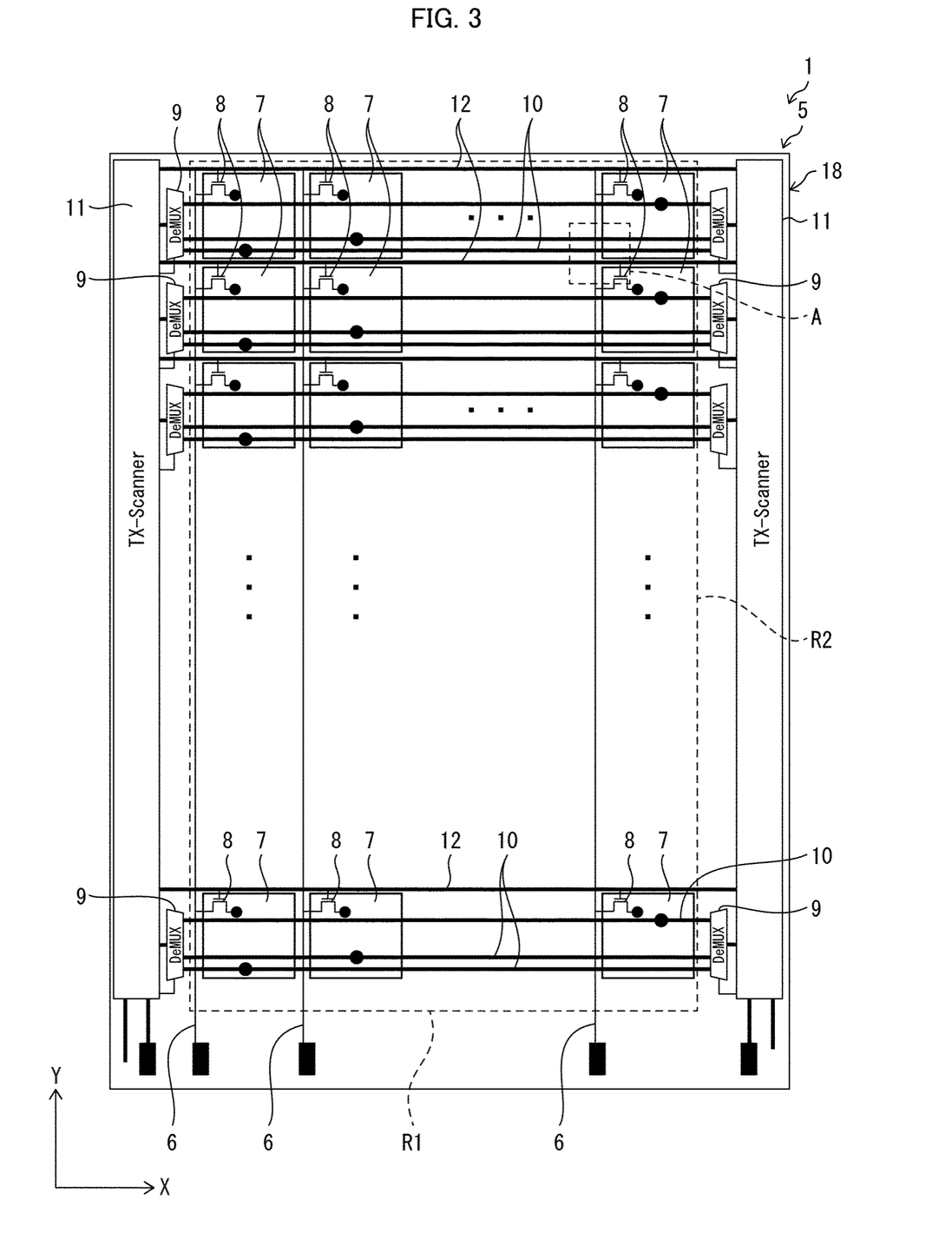
FIG. 3 is a plan view illustrating a configuration of a touchscreen included in the touchscreen-containing display.
Figure 4:
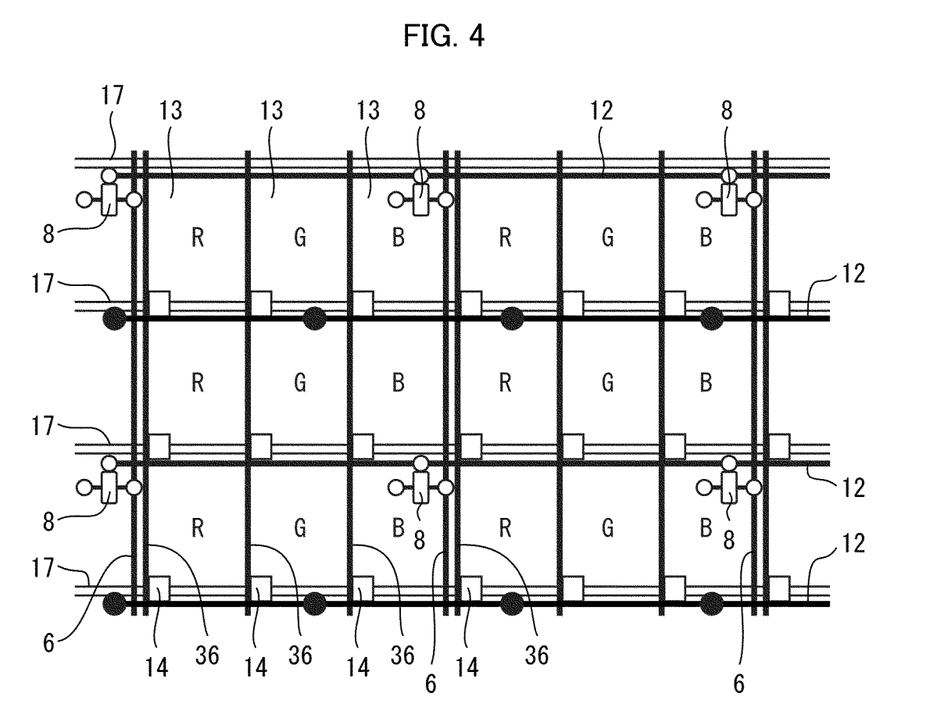
FIG. 4 is a plan view illustrating the details of area A shown in FIG. 3.
Figure 5:
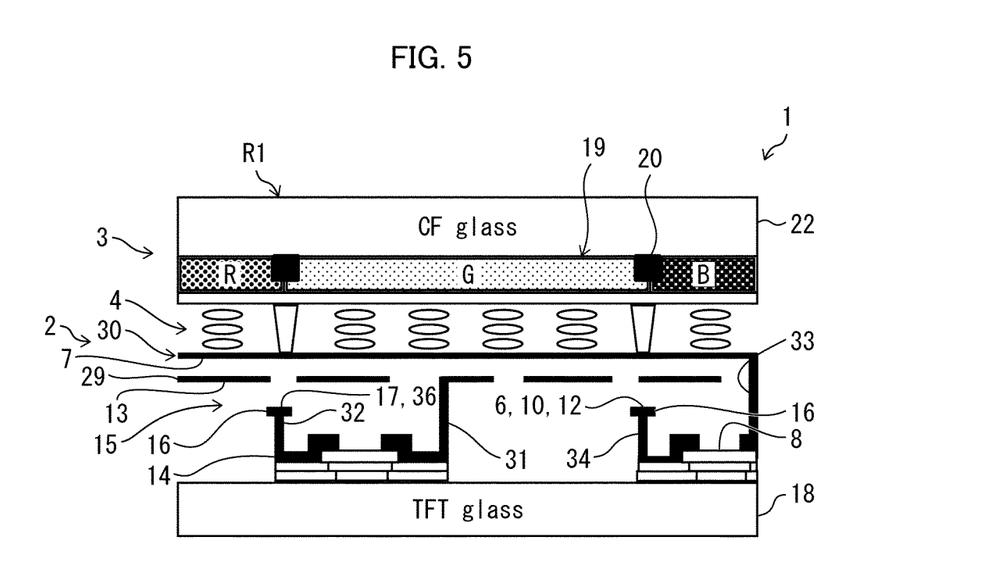
FIG. 5 is a cross-sectional view illustrating a pixel arrangement in an effective display region of a circuit board included in the touchscreen-containing display.

FIG. 1 is a cross-sectional view schematically illustrating a configuration of a touchscreen-containing display 1 in accordance with Embodiment 1. (a) of FIG. 2 illustrates how a self-capacitive pad electrode 7 included in the touchscreen-containing display 1 operates, and (b) of FIG. 2 illustrates how mutual-capacitive pad electrodes 7 operate. FIG. 3 is a plan view illustrating a configuration of a touchscreen 5 included in the touchscreen-containing display 1. FIG. 4 is a cross-sectional view illustrating a pixel configuration in an effective display region R1 of a circuit board 2 included in the touchscreen-containing display 1. FIG. 5 is a cross-sectional view illustrating a pixel configuration outside the effective display region R1 of the circuit board 2.

The touchscreen-containing display 1 includes: the circuit board 2; a counter substrate 3 that is disposed so as to face the circuit board 2; and a liquid crystal layer 4 (display layer) that lies between the circuit board 2 and the counter substrate 3. The circuit board 2 includes a TFT (thin film transistor) substrate 18. The counter substrate 3 includes a CF (color filter) substrate 21. The CF substrate 21 has, on its surface facing the liquid crystal layer 4, a color filter 19 and a black matrix 20. The color filter 19 is constituted by color filter layer parts R, G, and B arranged in a periodic manner. The black matrix 20 is in the form of a grid to define the color filter layer parts R, G, and B. There is a cover glass 22 on the opposite side of the CF substrate 21 from the liquid crystal layer 4.

The touchscreen-containing display 1 has the touchscreen 5 contained therein. The touchscreen 5 includes: M (M is an integer) sense lines 6 each of which extends in the Y direction indicated in FIG. 3; pad electrodes 7 that are arranged in N rows×M columns so as to correspond to the M sense lines 6; (N×M) switching elements 8 each of which is provided between a corresponding one of the sense lines 6 and a corresponding one of the pad electrodes 7; (2×N) multiplexers 9 arranged such that a pair of multiplexers 9 are provided at the opposite ends of each of the first to N-th rows of the pad electrodes 7; N sets of M drive lines 10 each of which connects between multiplexers 9 and one of the M pad electrodes 7 in a row that corresponds to the multiplexers 9; N selection lines 12 which are connected to the switching elements 8 and each of which extends in the X direction; and scan circuits 11 (driving circuits) that are connected to the multiplexers 9 and the selection lines 12. Each of the scan circuits 11 also serves as a gate driver monolithic (GDM) circuit to drive gate lines 17 for display pixels 13. The multiplexers 9 are disposed in a frame region that is outside the effective display region R1 where the plurality of display pixels 13 are present, and are positioned on the opposite sides, of the effective display region R1, at one of which one end of each drive line 10 extending in the X direction is located and at the other of which the other end of each drive line 10 is located. The scan circuits 11 select, through use of the multiplexers 9, pad electrodes 7 in one row.

As illustrated in (a) of FIG. 2, each of the pad electrodes 7 may be a self-capacitive electrode that is configured to detect a capacitance or a change in capacitance between the pad electrode 7 and a finger 23 (to-be-detected object). Alternatively, the pad electrodes 7 may be, as illustrated in (b) of FIG. 2, mutual-capacitive electrodes that are configured to detect a capacitance or a change in capacitance between the pad electrodes 7. Alternatively, the following arrangement may be employed utilizing flexibility of integration: different types of controllers are used to achieve active switching between self-capacitive mode and mutual-capacitive mode. By employing an arrangement in which the size of a touch sensor can be dynamically changed, it is possible to achieve a multifunctional, high-resolution touchscreen. The touchscreen-containing display 1 in accordance with Embodiment 1 is also applicable to a large-sized display. Referring to FIGS. 1, 2, 3, 4, and 5, on the TFT substrate 18 of the circuit board 2, a plurality of display pixels 13 are formed at the intersections of a plurality of data lines 36 each extending in the Y direction and a plurality of gate lines 17 each extending in the X direction. The TFT substrate 18 has a switching element layer 15 in which pixel switching elements 14 for switching of the display pixels 13 and the switching elements 8 disposed between the pad electrodes 7 and the sense lines 6 are provided. The pad electrodes 7 are provided on a common electrode layer 30 of the circuit board 2, and also serve as a common electrode (Vcom electrode) for forming electric fields that control the orientation of liquid crystal molecules contained in the liquid crystal layer 4.

The TFT substrate 18 further has a metal layer 16 (touchscreen wiring layer) on which the drive lines 10 serving to achieve the functions of the touchscreen 5 are provided.

As illustrated in FIGS. 3 and 5, each drive line 10 passes through via holes 34 and 33 and is connected to a corresponding pad electrode 7 on the common electrode layer 30, and extends along the metal layer 16 and is connected to corresponding multiplexers 9.

The pixel switching elements 14 are connected to the gate lines 17. The gate lines 17 are provided in order to control the pixel switching elements 14. Each of the switching elements 8 is disposed so as to correspond in position to one of the gate lines 17. Therefore, the switching elements 8 are located within the effective display region R1; however, the switching elements 8 are positioned so as to overlap the gate lines 17 and therefore the light transmittance of the liquid crystal layer 4 is prevented from lowering.

As illustrated in FIGS. 3 and 5, the gate lines 17 and the data lines 36 are connected to the pixel switching elements 14 via via holes 32, and extend along the metal layer 16 and are connected to the scan circuits 11. The sense lines 6 are provided on the metal layer 16, and pass through the via holes 34 and are connected to the switching elements 8. As such, the sense lines 6 of the touchscreen 5 extend along the metal layer 16, along which the data lines 36 for the display pixels 13 also extend.

The switching elements 8 are different in structure from the pixel switching elements 14 in that the switching elements 8 are connected to the common electrode layer via the via holes 33 whereas the pixel switching elements 14 are connected to a display pixel layer 29 via via holes 31.

The touchscreen 5 includes the N selection lines 12 (touch gate lines) each extending in the X direction (column direction). As illustrated in FIGS. 3 and 5, the selection lines 12 pass through the via holes 34 and are connected to the switching elements 8, and extend along the metal layer 16 and are connected to the scan circuits 11. By the switching elements 8, the pad electrodes 7 are selected via the selection lines 12. Then, the pad electrodes 7 are selectively detected through the switching elements 8 and the sense lines 6. Each of the selection lines 12 extends in the X direction (column direction), in the same manner as the gate lines 17.

Each of the switching elements 8 is provided so as to overlap a position, on the metal layer 16, which corresponds to one of the gate lines 17. This prevents the transmittance of the liquid crystal layer 4 from lowering.

Figure 6:
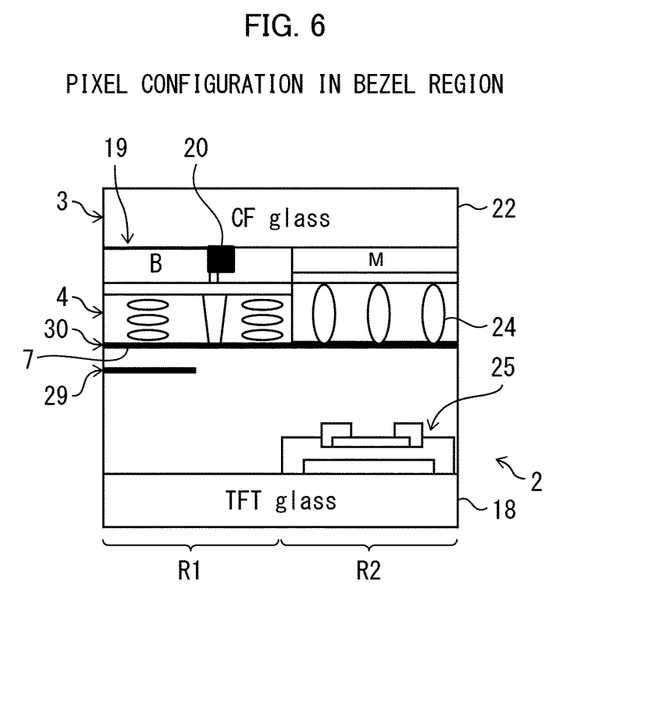
FIG. 6 is a cross-sectional view illustrating a pixel configuration outside the effective display region of the circuit board.

FIG. 6 is a cross-sectional view illustrating the details of a configuration of the circuit board 2. The TFT substrate 18 is provided with a GDM (Gate Driver Monolithic Circuit) TFT switching element 25 within a frame region R2 thereof. There are metal beads 24 above the GDM TFT switching element 25.

Figure 7:
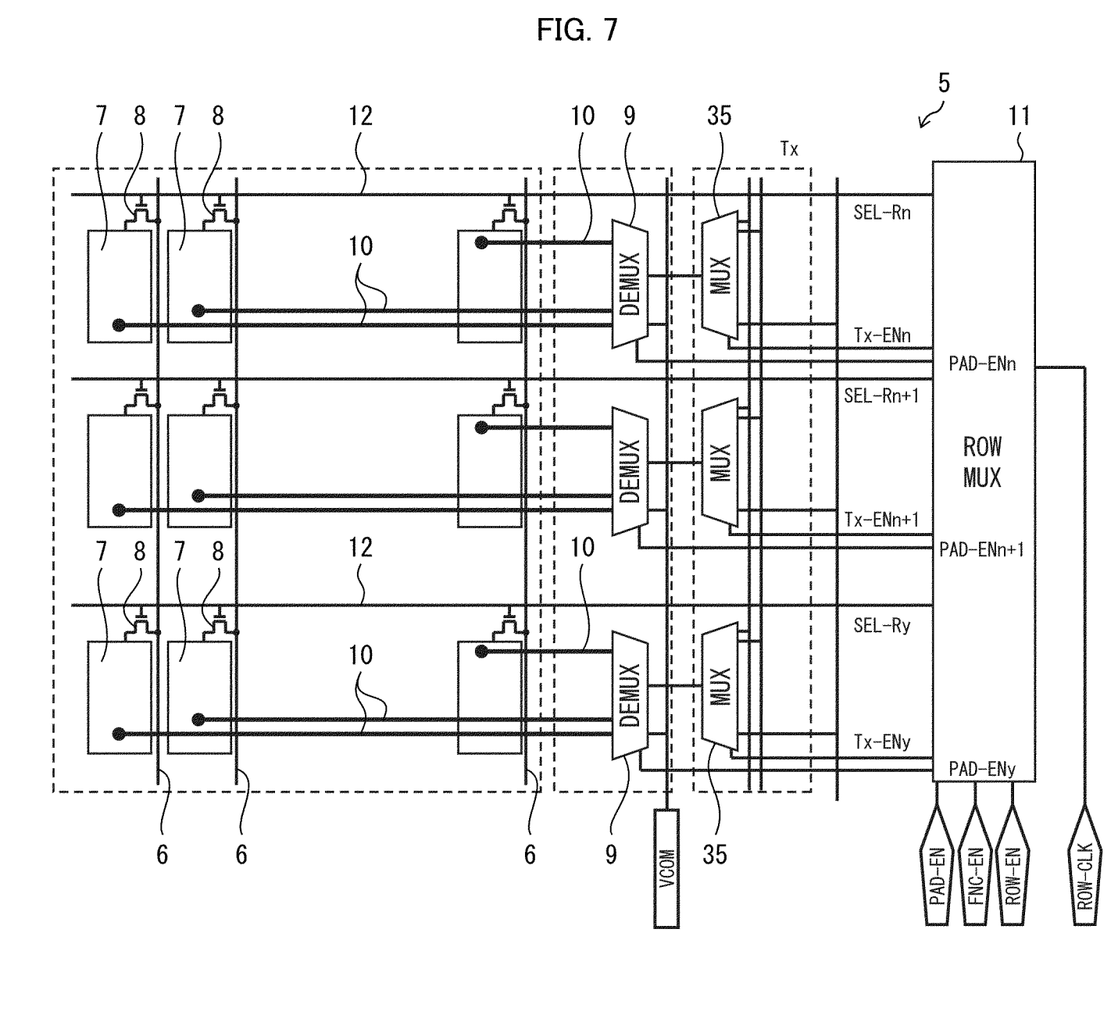
FIG. 7 is a block diagram illustrating multiplexers included in the touchscreen.
Figure 8:
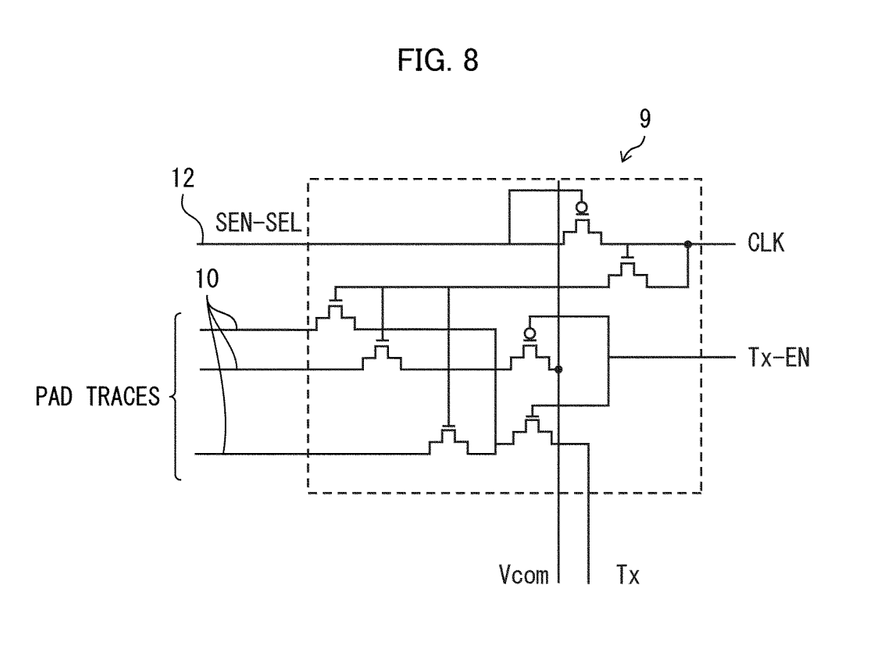
FIG. 8 is a circuit diagram illustrating a configuration of each multiplexer.
Figure 9:
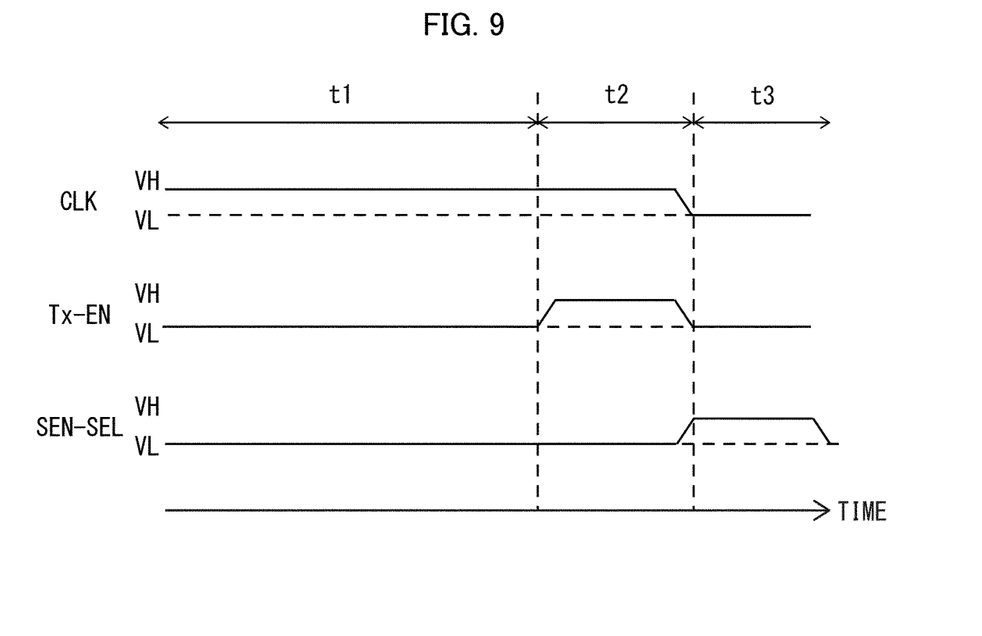
FIG. 9 is a timing chart illustrating how the multiplexer operates.

FIG. 7 is a block diagram illustrating the multiplexers 9 and multiplexers 35 included in the touchscreen 5. FIG. 8 is a circuit diagram illustrating a configuration of each multiplexer 9. FIG. 9 is a timing chart illustrating how the multiplexer 9 operates. Each multiplexer 9 is connected to corresponding pad electrodes 7, and is connected to a corresponding multiplexer 35 and a corresponding scan circuit 11. The multiplexer 35 is connected to a corresponding scan circuit 11.

The multiplexer 9 outputs a signal SEN-SEL to a corresponding selection line 12 based on a signal CLK and a signal Tx-EN, and supplies a signal Tx and a signal Vcom to corresponding drive lines 10.

During a Vcom period t1 during which the display pixels 13 are driven, the signal CLK at a high level is supplied to the multiplexer 9 and the signal Tx-EN at a low level is supplied to the multiplexer 9. The multiplexer 9 outputs the signal SEN-SEL at a low level. Next, during a Tx period t2 for the touchscreen 5, the signal CLK maintained at a high level is supplied to the multiplexer 9, and the signal Tx-EN having its level changed from low level to high level is supplied to the multiplexer 9. The multiplexer 9 outputs the signal SEN-SEL maintained at a low level.

Next, during an Rx period t3 for the touchscreen 5, the signal CLK having its level changed from high level to low level is supplied to the multiplexer 9, and the signal Tx-EN having its level changed from high level to low level is supplied to the multiplexer 9. The multiplexer 9 outputs the signal SEN-SEL having its level changed from low level to high level.

Embodiment 2

Figure 10:
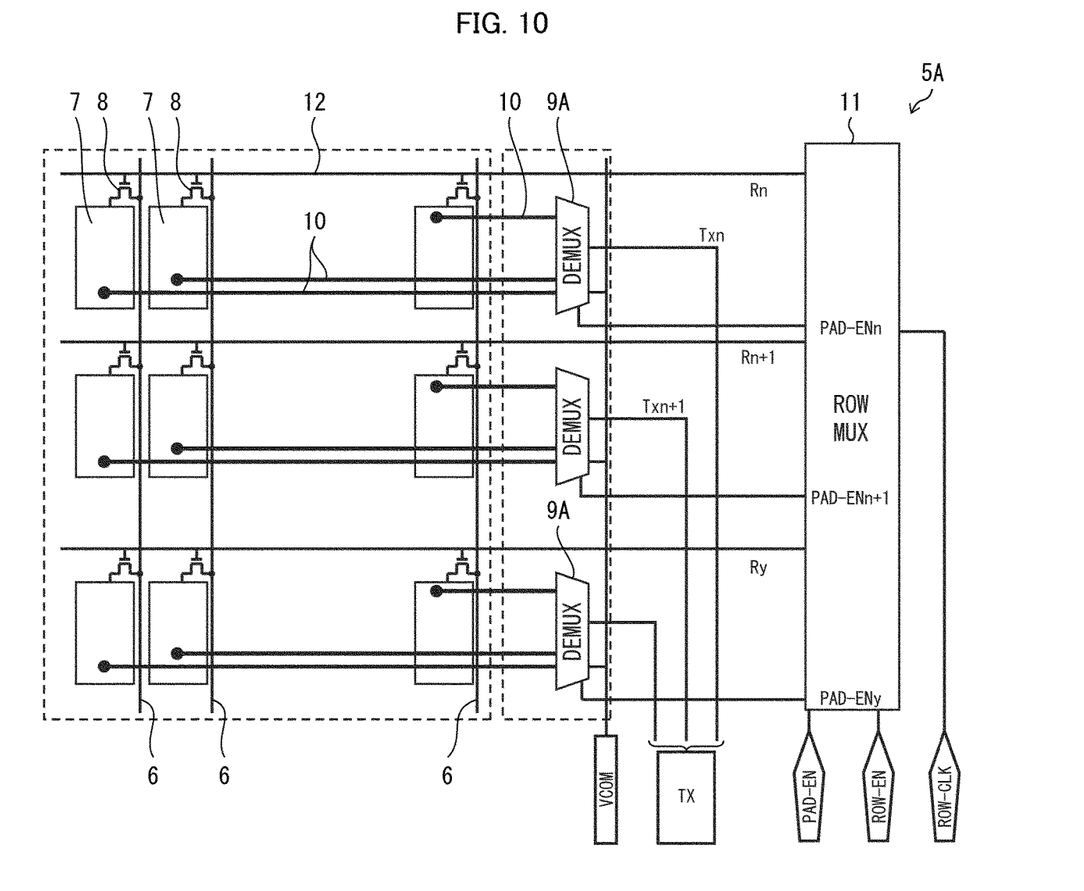
FIG. 10 is a block diagram illustrating a configuration of multiplexers of a touchscreen included in a touchscreen-containing display in accordance with Embodiment 2.
Figure 11:
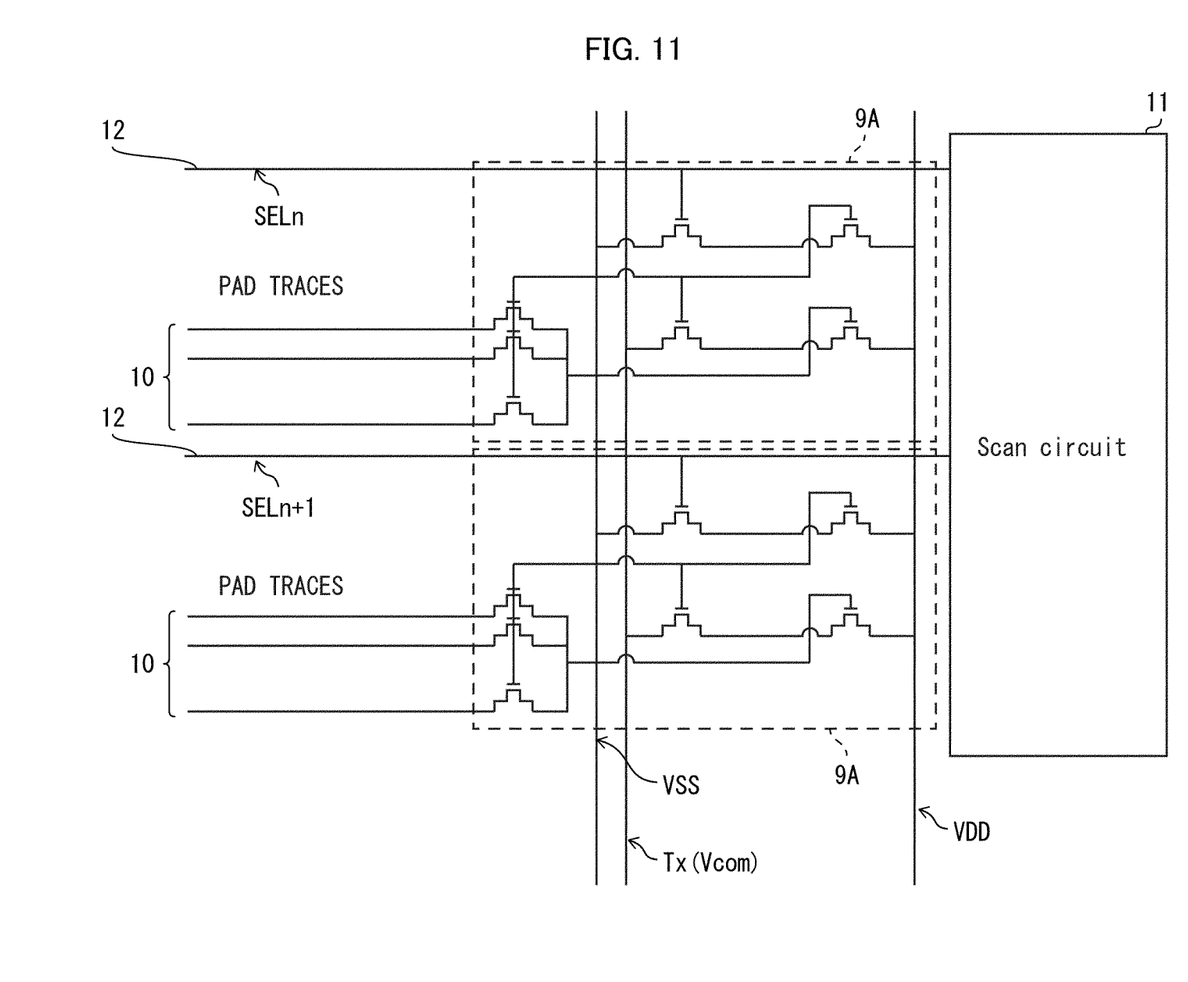
FIG. 11 is a circuit diagram illustrating the details of a configuration of the multiplexers.

The following description will discuss another embodiment of the present invention with reference to FIGS. 10 and 11. For convenience of description, members having functions identical to those described in Embodiment 1 are assigned identical referential numerals, and their descriptions are omitted here.

FIG. 10 is a block diagram illustrating a configuration of multiplexers 9A of a touchscreen 5A included in a touchscreen-containing display 1 in accordance with Embodiment 2. FIG. 11 is a circuit diagram illustrating the details of a configuration of the multiplexers 9A.

The touchscreen 5A in accordance with Embodiment 2 has a simpler configuration than the touchscreen 5 in accordance with Embodiment 1. The touchscreen 5A includes only the multiplexers 9A and does not include the multiplexers 35. Each of the multiplexers 9A outputs a signal SEL to a corresponding selection line 12 based on a signal VDD and a signal Tx (Vcom), and supplies a signal VSS to corresponding drive lines 10.

Embodiment 3

Figure 12:
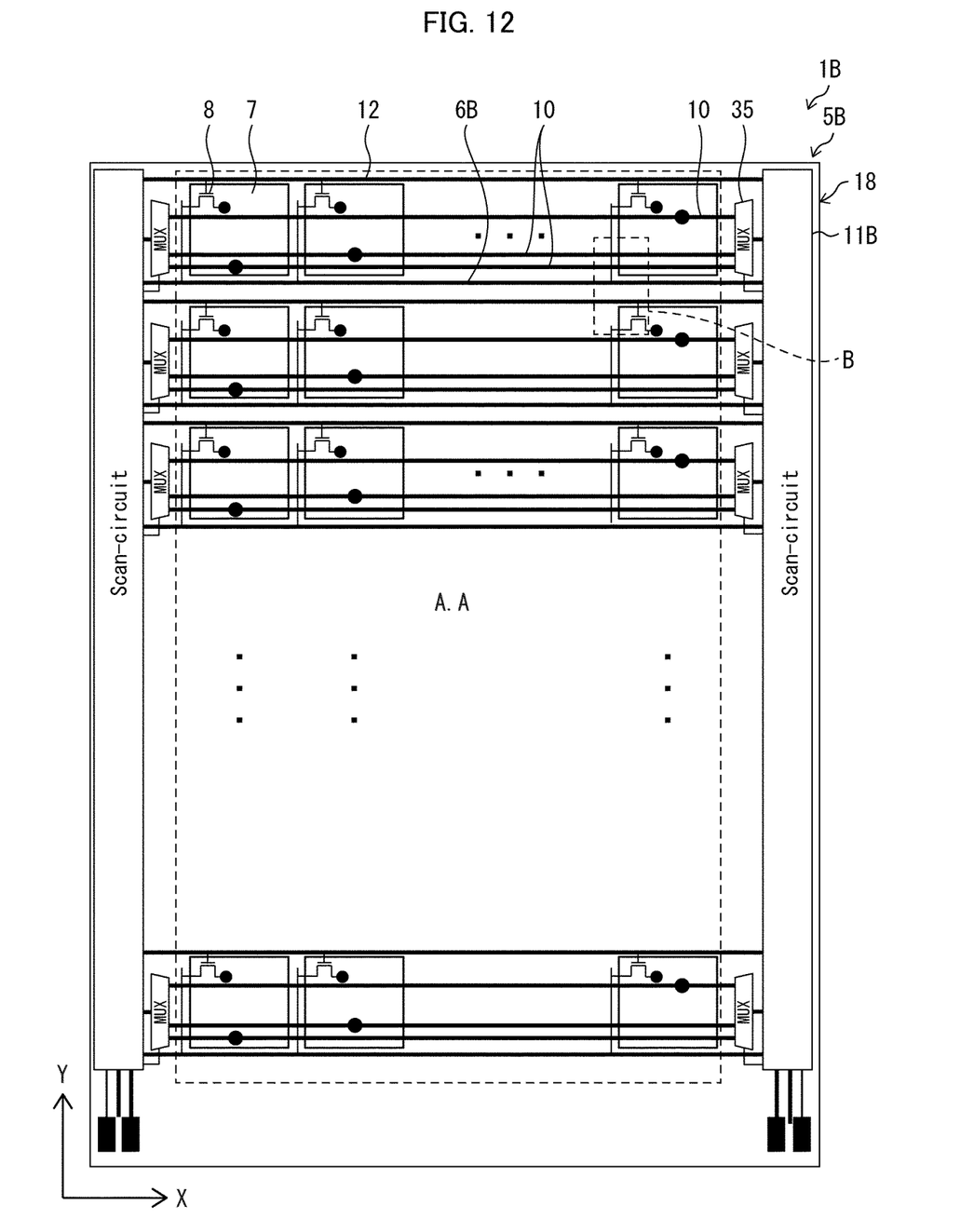
FIG. 12 is a plan view illustrating a configuration of a touchscreen included in a touchscreen-containing display in accordance with Embodiment 3.
Figure 13:
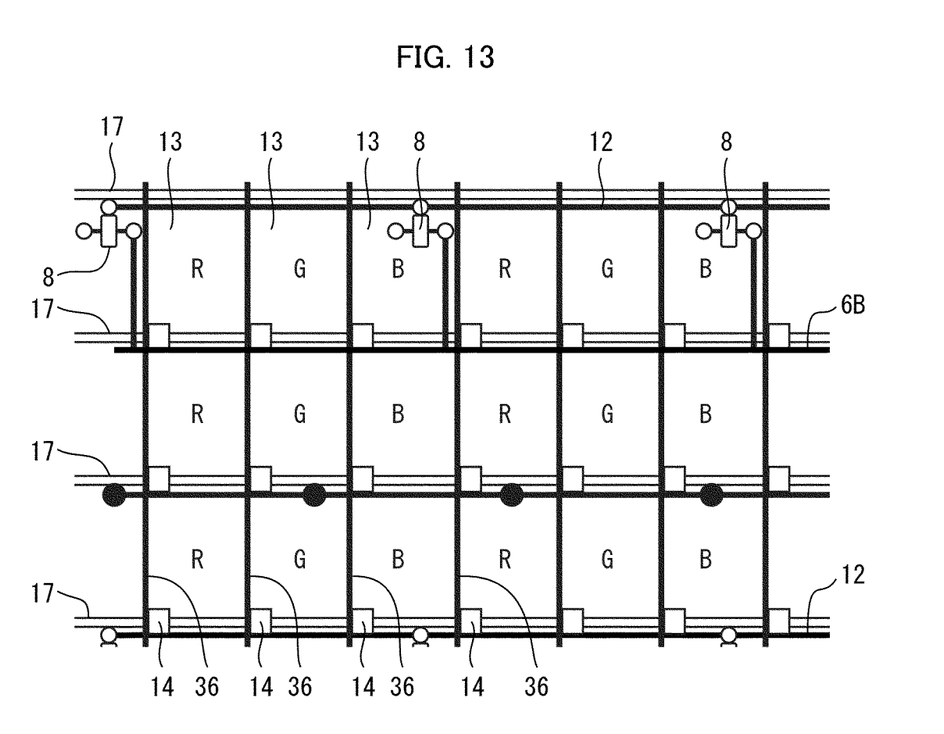
FIG. 13 is a plan view illustrating the details of area B shown in FIG. 12.

The following description will discuss a further embodiment of the present invention with reference to FIGS. 12 and 13. For convenience of description, members having functions identical to those described in Embodiments 1 and 2 are assigned identical referential numerals, and their descriptions are omitted here.

According to the touchscreen-containing display 1 in accordance with Embodiment 1, each of the sense lines 6 is connected to switching elements 8 that correspond to a column of pad electrodes 7, and extends in the Y direction; however, according to a touchscreen-containing display 1B in accordance with Embodiment 3, sense lines 6B are each connected to switching elements 8 that correspond to a row of pad electrodes 7, and each extend in the X direction and are coupled to scan circuits 11B.

As such, signals based on electric charge stored in the pad electrodes 7 are read from the pad electrodes 7 by the scan circuits 11B through the sense lines 6B on a row-by-row basis.

Embodiment 4

Figure 14:
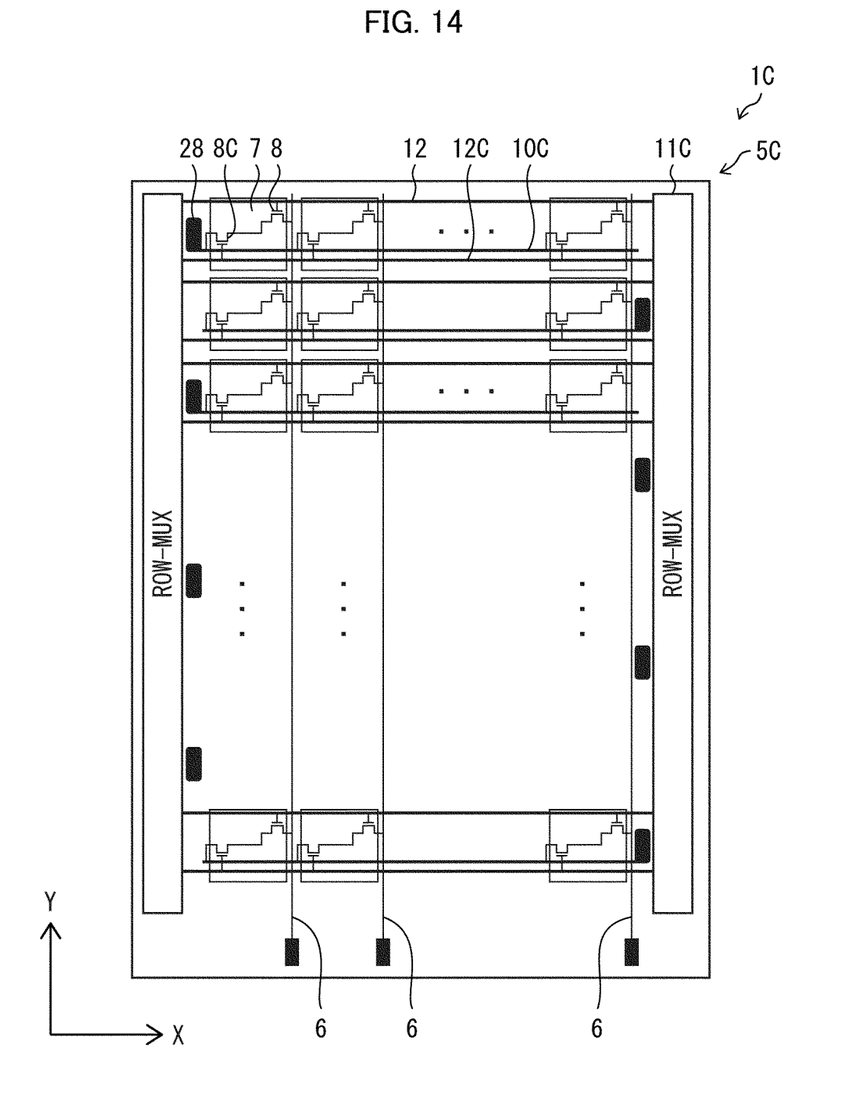
FIG. 14 is a plan view illustrating a configuration of a touchscreen included in a touchscreen-containing display in accordance with Embodiment 4.

The following description will discuss still a further embodiment of the present invention with reference to FIG. 14. For convenience of description, members having functions identical to those described in Embodiments 1 to 3 are assigned identical referential numerals, and their descriptions are omitted here.

FIG. 14 is a plan view illustrating a configuration of a touchscreen 5C included in a touchscreen-containing display 1C in accordance with Embodiment 4. Pad electrodes 7 of the touchscreen 5C each have two switching elements 8 and 8C. The switching element 8 is connected to a sense line 6 that extends in the Y direction, and is controlled by scan circuits 11C through a selection line 12 that extends in the X direction.

The switching element 8C is connected to a drive line 10C that extends in the X direction, and is controlled by the scan circuits 11C through a selection line 12C that extends in the X direction.

[Recap]

A touchscreen-containing display 1, 1A, 1B, 1C in accordance with Aspect 1 of the present invention includes: a circuit board 2 that includes display pixels 13 at intersections of data lines 36 and gate lines 17; a counter substrate 3 that is disposed so as to face the circuit board 2; a display layer (liquid crystal layer 4) that lies between the circuit board 2 and the counter substrate 3; and a touchscreen 5, 5A, 5B, 5C that is configured to detect a touch to the counter substrate 3, the touchscreen 5, 5A, 5B, 5C including M (M is a number of two or more) sense lines 6, 6A, 6B each of which extends parallel to the data lines 36, pad electrodes 7 that are arranged in N (N is a number or two or more) rows×M columns so as to correspond to the M sense lines 6, 6A, 6B, (N×M) switching elements 8 each of which is provided between a corresponding one of the M sense lines 6, 6A, 6B and a corresponding one of the pad electrodes 7, N multiplexers 9, 35 that are arranged so as to correspond to respective first to N-th rows of the pad electrodes 7, N sets of M drive lines 10, each of the M drive lines 10 connecting between one of the N multiplexers 9, 35 and one of M pad electrodes in a row that corresponds to the one of the N multiplexers 9, 35, and a driving circuit (scan circuit 11) that is connected to the N multiplexers 9, 35.

According to the above arrangement, it is possible to place the driving circuit and N multiplexers in a frame region that extends along the direction in which each sense line extends. Therefore, the driving circuit, which used to be disposed in a frame region that extends along the direction in which each drive line extends, can be moved to the frame region that extends along the direction in which each sense line extends. This makes it possible to reduce the width of the frame region that extends along the direction in which each sense line extends.

A touchscreen-containing display 1, 1A, 1B, 1C in accordance with Aspect 2 of the present invention may be arranged such that, in Aspect 1, the N multiplexers 9, 35 are located in a frame region R2 that is outside an effective display region R1 where the display pixels are 3 present.

According to the above arrangement, the effective display region includes no multiplexers. This makes it possible to avoid a lowering of the light transmittance at the effective display region.

A touchscreen-containing display 1, 1A, 1B, 1C in accordance with Aspect 3 of the present invention may be arranged such that, in Aspect 1 or 2, the circuit board 2 includes a switching element layer 15 in which pixel switching elements 14 for switching of the display pixels 13 and the switching elements 8 are provided.

According to the above arrangement, it is possible to form the pixel switching elements and the switching elements, which are similar in configuration to each other, in a single layer.

A touchscreen-containing display 1, 1A, 1B, 1C in accordance with Aspect 4 of the present invention may be arranged such that, in any one of Aspect 1 to 3, the circuit board 2 further includes a touchscreen wiring layer (metal layer 16) on which the (M×N) drive lines 10 are provided.

According to the above arrangement, the drive lines can be connected to the multiplexers via the touchscreen wiring layer.

A touchscreen-containing display 1, 1A, 1B, 1C in accordance with Aspect 5 of the present invention may be arranged such that, in any one of Aspect 1 to 4, the touchscreen 5, 5A, 5B, 5C further includes N touch gate lines (selection lines 12) each of which is connected to corresponding ones of the (N×M) switching elements 8 and each of which extends in a column direction.

According to the above arrangement, it is possible to select, through a touch gate line, pad electrodes from which electric charge signals are to be read through a sense line.

A touchscreen-containing display 1, 1A, 1B, 1C in accordance with Aspect 6 of the present invention may be arranged such that, in any one of Aspect 1 to 5: the gate lines 17 are connected to the pixel switching elements 14; and the (N×M) switching elements 8 are each disposed so as to correspond in position to a corresponding one of the gate lines 17.

According to the above arrangement, each switching element is positioned so as to overlap a corresponding gate line. This prevents the switching element from causing a reduction in light transmittance at the effective display region.

A touchscreen-containing display 1, 1A, 1B, 1C in accordance with Aspect 7 of the present invention may be arranged such that, in any one of Aspect 1 to 6, each of the pad electrodes 7 is configured to detect a capacitance or a change in capacitance between each of the pad electrodes 7 and a to-be-detected object.

According to the above arrangement, it is possible to apply the present invention to a self-capacitive pad electrode.

A touchscreen-containing display 1, 1A, 1B, 1C in accordance with Aspect 8 of the present invention may be arranged such that, in any one of Aspect 1 to 6, the pad electrodes 7 are configured to detect a capacitance or a change in capacitance between the pad electrodes 7.

According to the above arrangement, it is possible to apply the present invention to a mutual-capacitive pad electrode.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1 touchscreen-containing display
2 circuit board
3 counter substrate
4 liquid crystal layer (display layer)
5 touchscreen
6 sense line
7 pad electrode
8 switching element
9 multiplexer
10 drive lines
11 scan circuit (driving circuit)
12 touch gate line
13 display pixel
14 pixel switching element
15 switching element layer
16 metal layer (touchscreen wiring layer)

The invention claimed is:

1. A touchscreen-containing display, comprising:
a circuit board that includes display pixels at intersections of data lines and gate lines;
a counter substrate that is disposed so as to face the circuit board;
a display layer that lies between the circuit board and the counter substrate; and
a touchscreen that is configured to detect a touch to the counter substrate,
the touchscreen including
M (M is a number of two or more) sense lines each of which extends parallel to the data lines,
pad electrodes that are arranged in N (N is a number or two or more) rows×M columns so as to correspond to the M sense lines,
(N×M) switching elements each of which is provided between a corresponding one of the M sense lines and a corresponding one of the pad electrodes,
N multiplexers that are arranged so as to correspond to respective first to N-th rows of the pad electrodes,
N sets of M drive lines, each of the M drive lines connecting between one of the N multiplexers and one of M pad electrodes in a row that corresponds to the one of the N multiplexers, and
a driving circuit that is connected to the N multiplexers; wherein
the circuit board includes a switching element layer in which pixel switching elements for switching of the display pixels and the switching elements are provided;
the gate lines are connected to the pixel switching elements; and
the (N×M) switching elements are each disposed so as to correspond in position to a corresponding one of the gate lines.

2. The touchscreen-containing display according to claim 1, wherein the N multiplexers are located in a frame region that is outside an effective display region where the display pixels are present.

3. The touchscreen-containing display according to claim 1, wherein the circuit board further includes a touchscreen wiring layer on which the (MxN) drive lines are provided.

4. The touchscreen-containing display according to claim 1, wherein the touchscreen further includes N touch gate lines each of which is connected to corresponding ones of the (N×M) switching elements and each of which extends in a column direction.

5. The touchscreen-containing display according to claim 1, wherein each of the pad electrodes is configured to detect a capacitance or a change in capacitance between each of the pad electrodes and a to-be-detected object.

6. The touchscreen-containing display according to claim 1, wherein the pad electrodes are configured to detect a capacitance or a change in capacitance between the pad electrodes.

* * * * *